(12) United States Patent
Laff et al.

(10) Patent No.: US 7,774,712 B2
(45) Date of Patent: Aug. 10, 2010

(54) METHODS AND SYSTEMS FOR DISPLAYING AN ENLARGED IMAGE

(75) Inventors: Steven Laff, Santa Monica, CA (US); Mark Ormston, Auburn, WA (US)

(73) Assignee: A Far Site Better, LLC, Santa Monica, CA (US)

(*) Notice: Subject to any disclaimer, the term of this patent is extended or adjusted under 35 U.S.C. 154(b) by 0 days.

(21) Appl. No.: 11/027,863

(22) Filed: Dec. 31, 2004

(65) Prior Publication Data

US 2006/0150099 A1  Jul. 6, 2006

(51) Int. Cl.
 *G06F 3/00* (2006.01)
 *G06F 9/00* (2006.01)
 *G06F 17/00* (2006.01)

(52) U.S. Cl. .................. 715/763; 715/762; 715/760; 715/764; 715/708; 715/967

(58) Field of Classification Search ............. 715/967, 715/763, 762, 764, 708
See application file for complete search history.

(56) References Cited

U.S. PATENT DOCUMENTS

| | | | | | |
|---|---|---|---|---|---|
| 5,302,968 | A | * | 4/1994 | Heberle ...................... | 345/671 |
| 5,995,984 | A | * | 11/1999 | Lau et al. .................... | 715/505 |
| 6,006,191 | A | * | 12/1999 | DiRienzo ...................... | 705/2 |
| 6,049,754 | A | * | 4/2000 | Beaton et al. ............... | 701/204 |
| 6,195,122 | B1 | * | 2/2001 | Vincent ...................... | 348/169 |
| 6,711,297 | B1 | * | 3/2004 | Chang et al. ................. | 382/240 |
| 6,924,822 | B2 | * | 8/2005 | Card et al. ................... | 345/660 |
| 2002/0075289 | A1 | * | 6/2002 | Hatori et al. ................ | 345/698 |
| 2003/0193603 | A1 | * | 10/2003 | Parulski et al. ........... | 348/333.12 |
| 2004/0171371 | A1 | * | 9/2004 | Paul ........................ | 455/414.4 |
| 2004/0179744 | A1 | * | 9/2004 | Chang et al. ................ | 382/240 |
| 2004/0223731 | A1 | * | 11/2004 | Ozawa et al. ................ | 386/46 |
| 2004/0250216 | A1 | * | 12/2004 | Roman et al. ............... | 715/800 |
| 2005/0153746 | A1 | * | 7/2005 | Yoon ........................ | 455/566 |
| 2005/0212823 | A1 | * | 9/2005 | Uthe et al. .................. | 345/660 |
| 2006/0033762 | A1 | * | 2/2006 | Card et al. .................. | 345/660 |

OTHER PUBLICATIONS

Scene 7—Solutions—Demos; pp. 1-2; http://www.scene7.com/demos/retail/zoom.asp.

(Continued)

*Primary Examiner*—Tadesse Hailu
*Assistant Examiner*—Anita D Chaudhuri
(74) *Attorney, Agent, or Firm*—Michael Best & Friedrich LLP (57) ABSTRACT

A method and system for displaying an enlarged image on a display. The display is configured to be connected to a device that generates a user interface in which a user may control a position of a cursor. The method can include providing a first image, providing an enlarged version of the first image, and displaying the first image at a first location on the display. The method can also include determining a position of a cursor and, if the position of the cursor overlaps with the location of the first image, determining a portion of the enlarged version of the first image, where the portion of the enlarged version of the first image is determined based on the position of the cursor. The method can further include displaying the portion of the enlarged version of the first image at a second location on the display.

12 Claims, 7 Drawing Sheets

OTHER PUBLICATIONS

Equilibrium; product tour; pp. 1-3; http://www.equilibrium.com/Internet/Equil/Products/MediaRich+Merchandiser/Product+Tour.htm.

Zoomify ::: Zommifyer Enterprise; pp. 1-2; http://www.zoomify.com/enterprise/.

Zoomify ::: Zoomifyer for Flash; pp. 1-2; http://www.zoomify.com/flash/.

Zoomify ::: Zommifier EZ; pp. 1-2; http://www.zoomify.com/ez/.

Great Northern Corporation; Packaging Services; Protective; pp. 1-2; http://www.greatnortherncorp.com/index2.htm.

Great North Corporation; Packaging Services; Promotional; pp. 1-2; http://www.greatnortherncorp.com/index2.htm.

Great Northern Corporation; Packaging Services; Corrugated & Custom; pp. 1-2; http://www.greatnortherncorp.com/index2.htm.

Equilibrium; Enhanced Pixel Zoom & Pan; pp. 1-2; http://www.equilibrium.com/demos/dlxzoom/dlxzoom.htm.

Equilibrium; MediaRich; product tour; zoom; p. 1; http://www.equilibrium.com/Internet/Equil/Products/MediaRich/Product+Tour/Zoom.htm.

Example 1; http://www.jespersdesigns.com/zoom/example.htm.

Example[1]; http://valid.tjp.hu/zoom/index_en.html.

Example6[1]; http://valid.tjp.hu/zoom/index_en.html.

JavaScript/CSS/DOM image zoomer—tjpzoom 2.0; http://valid.tjp.hu/zoom2/index_en.html.

JavaScrip/CSS/DOM image magnifier; http://valid.tjp.hu/zoom/index_en.html.

* cited by examiner

METHODS AND SYSTEMS FOR DISPLAYING AN ENLARGED IMAGE

BACKGROUND OF THE INVENTION

Embodiments of the invention relate to methods and systems for displaying a portion of an enlarged version of an image. In particular, embodiments of the invention relate to methods and systems for displaying a portion of an enlarged version of an image based on the position of a cursor.

Users of the Internet or other networks such as a local area network ("LAN") or a wide area network (WAN) often obtain and view images on a workstation. In some situations, a user may want to view an enlarged version of an image. Viewing a magnified or enlarged image can allow a user to view details and features of an image that may otherwise be difficult to see. An enlarged version of an image can be used to display texture, color, workmanship detail, and the like, and are often used by sellers to provide additional information to potential customers.

Although some web sites or web pages provide enlarged versions of images, users typically do not have control over how an enlarged image is displayed. For example, an image displayed on a web page may include two features and the web page may only provide an enlarged version of the image displaying only one of the two features. Users are generally not provided with tools to specify a particular portion of an image to view as an enlarged image.

SUMMARY OF THE INVENTION

Accordingly, embodiments of the invention provide a method of displaying an enlarged image on a display. In one embodiment, the display is configured to be connected to a device that generates a user interface in which a user may control a position of a cursor. The method includes providing a first image, providing an enlarged version of the first image, and displaying the first image at a first location on the display. The method also includes determining a position of the cursor and, if the position of the cursor overlaps with the location of the first image, determining a portion of the enlarged version of the first image. The portion of the enlarged version of the first image is determined based on the position of the cursor. The method further includes displaying the portion of the enlarged version of the first image at a second location on the display.

Another embodiment provides a computer-readable medium including instructions for displaying an enlarged image on a display. The display is configured to be connected to a device that generates a user interface in which a user may control a position of a cursor. The computer-readable medium includes instructions for providing a first image, providing an enlarged version of the first image, and displaying the first image at a first location on the display. The computer-readable medium also includes instructions for determining a position of a cursor and, if the position of the cursor overlaps with the location of the first image, determining a portion of the enlarged version of the first image. The portion of the enlarged version of the first image is determined based on the position of the cursor. The computer-readable medium further includes instructions for displaying the portion of the enlarged version of the first image at a second location on the display.

Additional embodiments provide a system for displaying an enlarged image on a display. The display is configured to be connected to a device that generates a user interface in which a user may control a position of a cursor. The system includes a first image, an enlarged version of the first image, and an application. The application is configured to display the first image at a first location on the display. The application is also configured to determine a position of the cursor and, if the position of the cursor overlaps with the first location of the first image, to determine a portion of the enlarged version of the first image based on the position of the cursor. Furthermore, the application is configured to display the portion of the enlarged version of the first image at a second location on the display.

Yet another embodiment provides a system for displaying an enlarged image on a display. The display is configured to be connected to a device that generates a user interface in which a user may control a position of a cursor. The system includes a memory configured to store a first image, an enlarged version of the first image, and an enlargement application. The system also includes a processor configured to execute the enlargement application. The enlargement application is configured to display the first image at a first location on the display. The enlargement application is also configured to determine a position of a cursor and, if the position of the cursor overlaps with the location of the first image, to determine a portion of the enlarged version of the first image. Furthermore, the enlargement application is configured to determine the portion of the enlarged version of the first image based on the position of the cursor and to display the portion of the enlarged version of the first image at a second location on the display.

Other features and advantages of embodiments of the invention will become apparent to those skilled in the art upon review of the following detailed description and drawings.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
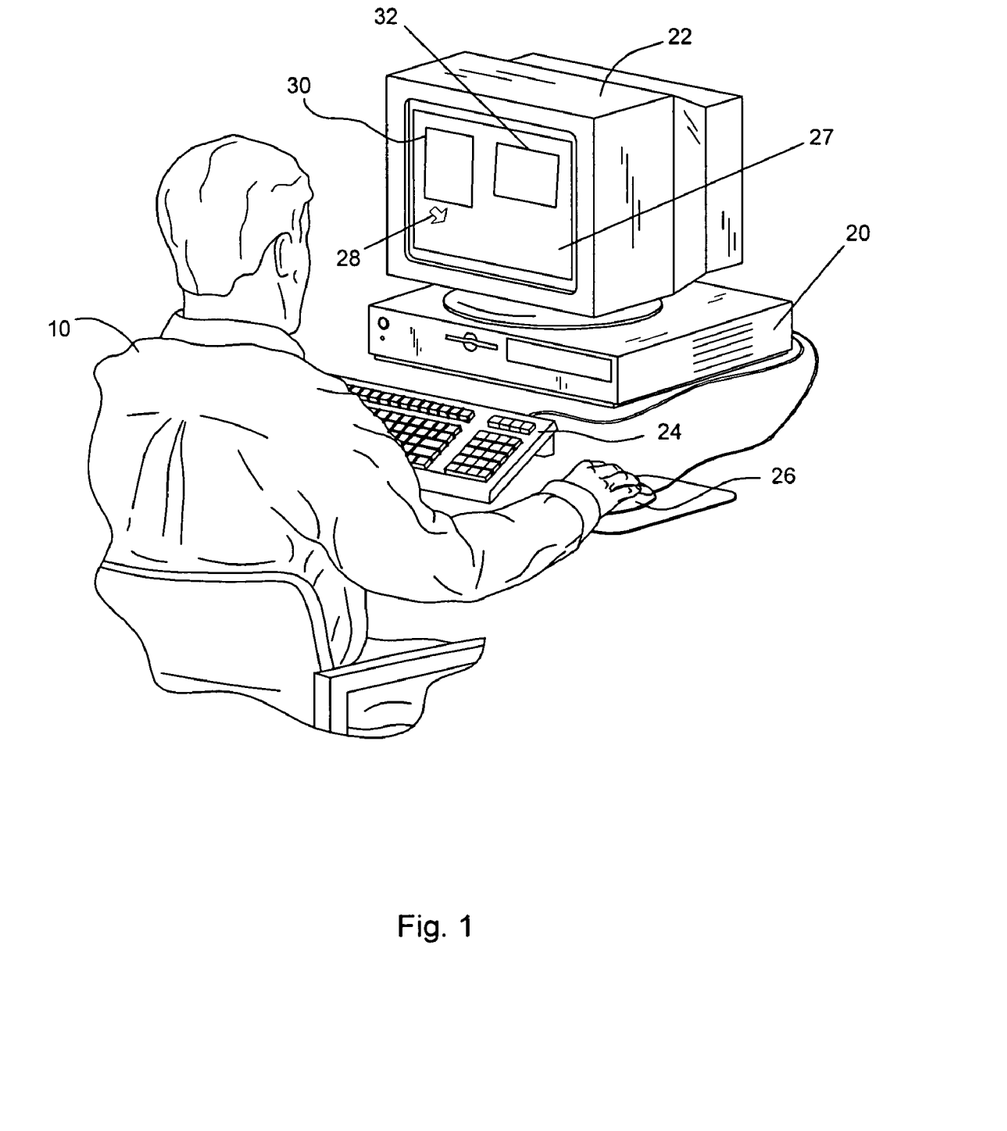
FIG. 1 illustrates a user using a workstation to view an image.

FIG. 1 illustrates a user 10 using a workstation 20. The workstation 20 includes a monitor or display 22, a keyboard 24, and a cursor control device 26 illustrated in the form of a mouse. In some embodiments, the workstation 20 is configured to generate a user interface 27 and present the user interface 27 on the display 22. The user 10 can use the keyboard 24 and/or the cursor control device 26 to position a cursor 28 on the user interface 27. In some embodiments, the user 10 uses the keyboard 24 and/or the cursor control device 26 to position the cursor 28 on a first image 30 or a second image 32 displayed as part of the user interface 27.

It should be understood that the workstation 20 can include additional input peripherals in addition to or in place of the input peripherals (i.e., the keyboard 24 and the cursor control device 26) illustrated in FIG. 1 to control the position of the cursor 28. These devices can include a touch screen, a joystick, a trackball, arrow buttons or keys, a user-movement tracking device (e.g., an eye-movement tracking device or a virtual reality glove), and/or a microphone. As should also be apparent, the workstation 20 can include multiple displays and cursor control devices. The workstation 20 can also include additional peripherals such as a printer, a scanner, and the like. The workstation 20 can also be connected to a network such as the Internet or a local area network ("LAN"). In some embodiments, the workstation is connected to a modem, router, or switch configured to provide a network connection that allows the workstation 20 to send and receive data from other devices also connected to a network.

It should be understood that in place of the workstation 20 the user 10 can also use a television, a cellular phone, a digital versatile disc ("DVD") player, a personal digital assistant ("PDA"), a video game device, and the like, to view a user interface.

Figure 2:
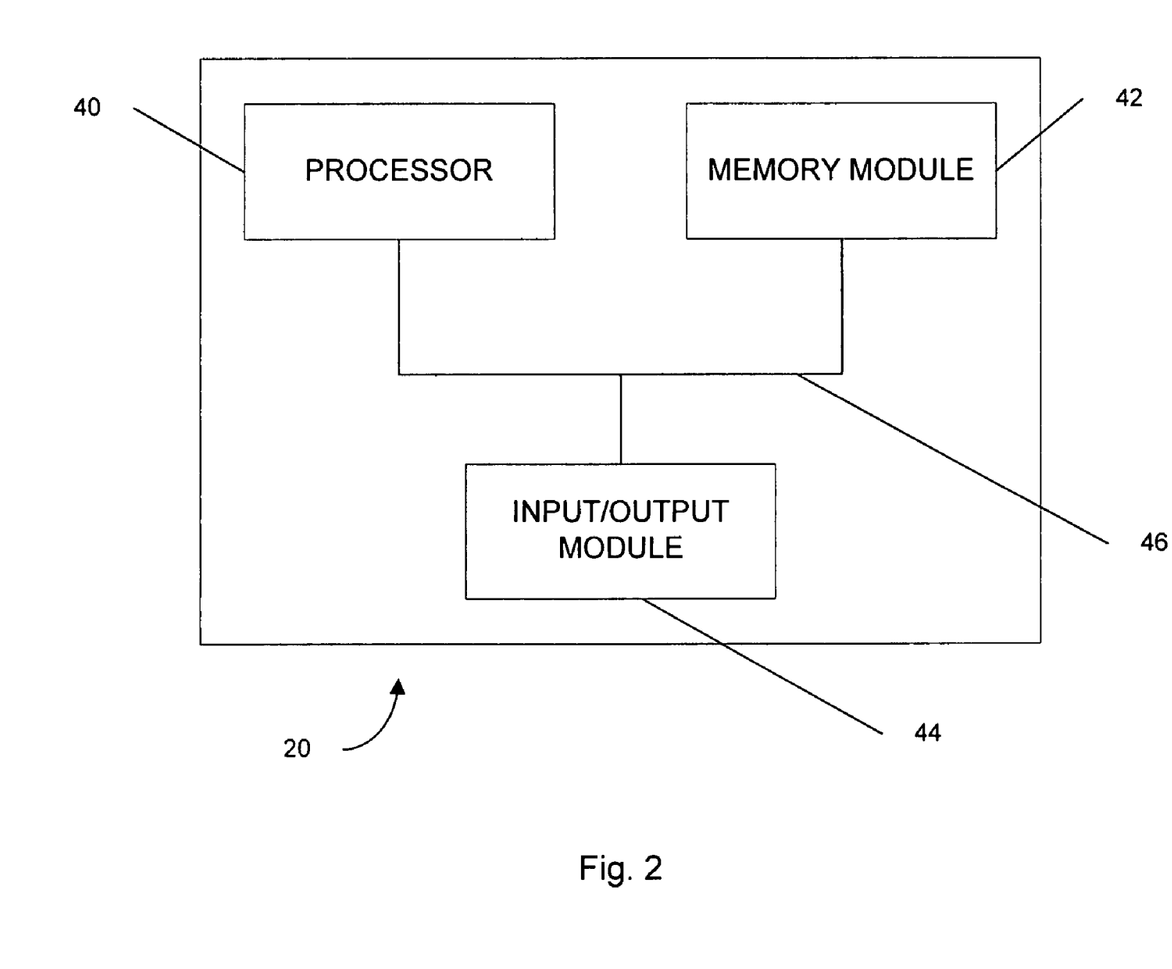
FIG. 2 is a schematic diagram of exemplary hardware inside the workstation of FIG. 1.

FIG. 2 illustrates exemplary hardware that can be included in the workstation 20. As illustrated in FIG. 2, the workstation 20 includes a processor 40, a memory module 42, and an input/output module 44. The processor 40, the memory module 42, and the input/output module 44 are connected with a connection or bus 46.

The processor 40 of the workstation 20 can include a microprocessor, an application specific integrated circuit ("ASIC"), or a combination thereof. In some embodiments, the processor 40 can be configured to fetch instructions and/or data from the memory module 42 via the bus 46 and execute the instructions to process the data. The memory module 42 can include non-volatile memory such as one or more forms of ROM, one or more disk drives, RAM, other memory, or combinations of the foregoing.

Figure 3:
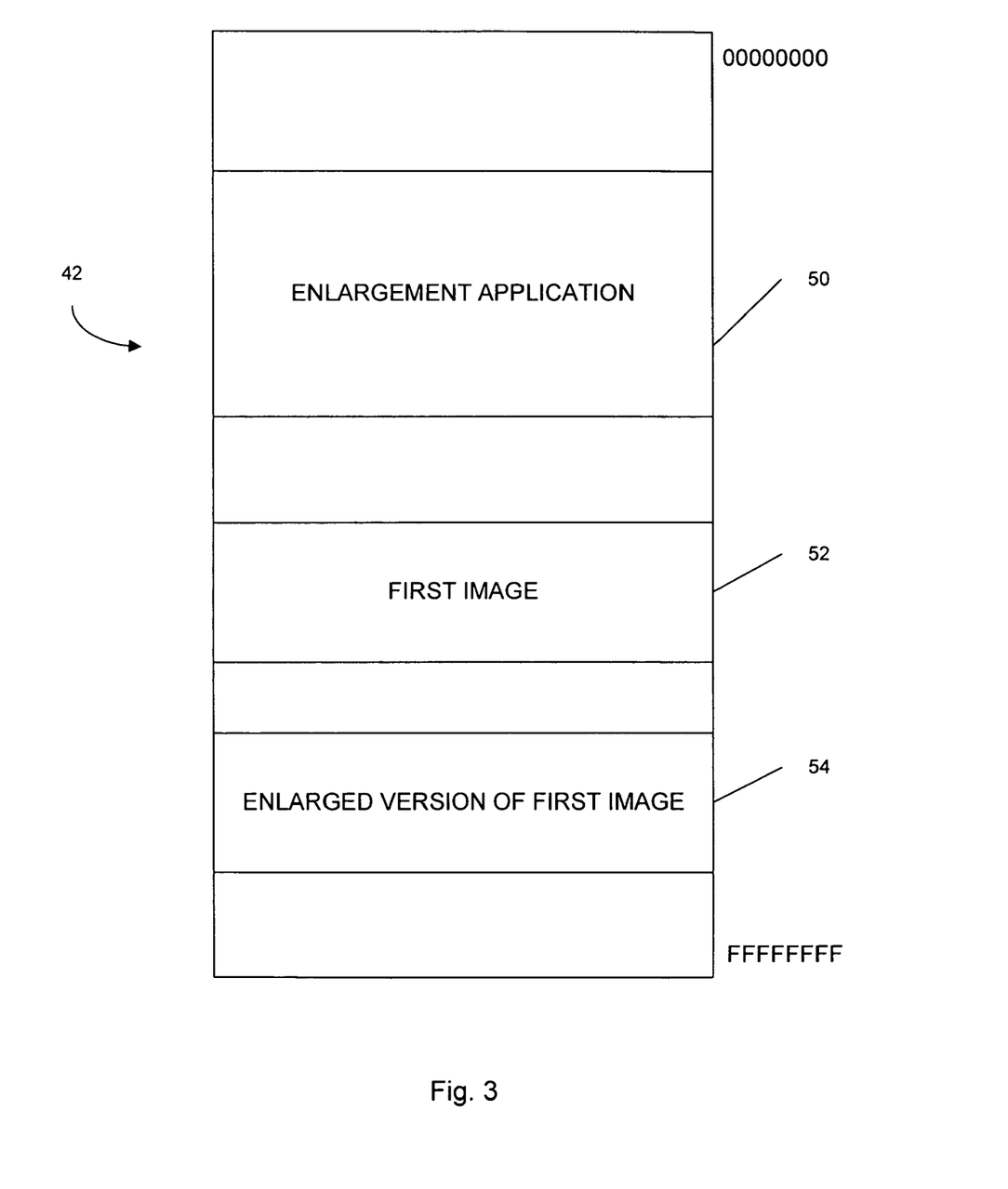
FIG. 3 is a diagram of non-volatile memory, which can be part of the memory module of the workstation illustrated in FIG. 2.

FIG. 3 represents a diagram of a portion of the memory module 42 of the workstation 20. As illustrated in FIG. 3, the memory module 42 stores an enlargement application 50, a first image 52, and an enlarged version of the first image 54 (hereafter "second image"). In some embodiments, the second image 54 can include the first image 52 magnified or enlarged by a predetermined factor. For example, if the first image 52 is 350 pixels wide by 200 pixels high, the second image 54 can include the first image enlarged four times such that the second image 54 is 1400 pixels wide by 800 pixels high.

In some embodiments, first image 52 is pre-generated from the second image 54. As described above, the first image 52 can include a subset of the pixels of the second image 54. For example, the first image 52 can include every fourth pixel of the second image 54. The first image 52 can also include average pixels of the second image 54, such as an average pixel for every four pixels of the second image 54. In some embodiments, the first image 52 can also be dynamically generated based on the second image 54 stored in the memory module 42.

The processor 40 can be configured to retrieve the enlargement application 50, the first image 52, and the second image 54 from the memory module 42. In some embodiments, the processor 40 executes the enlargement application 50 to display the first image 52 and a portion of the second image 54 on the display 22.

In the embodiment shown, the input/output module 44 is configured to receive and transmit data to peripherals (e.g., the display 22, the keyboard 24, and the cursor control device 26) connected to the workstation 20. The input/output module 44 transmits data to the display 22 to present the user interface 27 to the user 10. In some embodiments, the input/output module 44 transmits the first image 50 and a portion of the second image 54 as part of the user interface 27. The input/output module 44 also receives data from input peripherals, such as the keyboard 24 and/or the cursor control device 26. The data received from the input peripherals is used to position the cursor 28 displayed on the user interface 27. As previously described, the user 10 can use the input peripherals to indicate a desired position of the cursor 28. The input/output module 44 provides the received data to the processor 40 and/or the memory module 42.

In some embodiments, the input/output module 44 receives and transmits data on a network (not shown) such as the Internet or a local area network ("LAN"). In some embodiments, the user 10, operating the workstation 20, generates a request to view the first image 52. The input/output module 44 transmits the request with the network to another device (e.g., a web server) connected to the network. The device receives the request and services the request by transmitting the first image 52 and the second image 54 to the workstation 20. In some embodiments, the device also transmits the enlargement application 50 to the workstation 20. The enlargement application 50 can include a hypertext mark-up language ("HTML") page or file. The HTML file can include scripts or programs (e.g., JavaScript functions) that, when executed by the workstation 20 or a browser application executing on the workstation 20, displays the first image 52 and a portion of the second image 54 on the display 22 of the workstation 20. The enlargement application 50, or portions of the enlargement application 50 can also be previously stored to the memory module 42 of the workstation 20. The first image 52 and the second image 54 can also be previously stored to the memory module 42.

Upon receiving the first image 52 and the second image 54, the input/output module 44 forwards the first image 52 and the second image 54 to the processor 40. The input/output module 44 can also forward the enlargement application 50, if received, to the processor 40. As previously described, the processor can execute the enlargement application 50 to display the first image 52 and a portion of the second image 54 on the display 22. The input/output module 44 can also forward the first image 52, the second image 54, and the enlargement application 50, if received, to the memory module 42. As described above, the processor 40 can fetch the enlargement application 50, the first image 52, and the second image 54 from the memory module 42.

Figure 4:
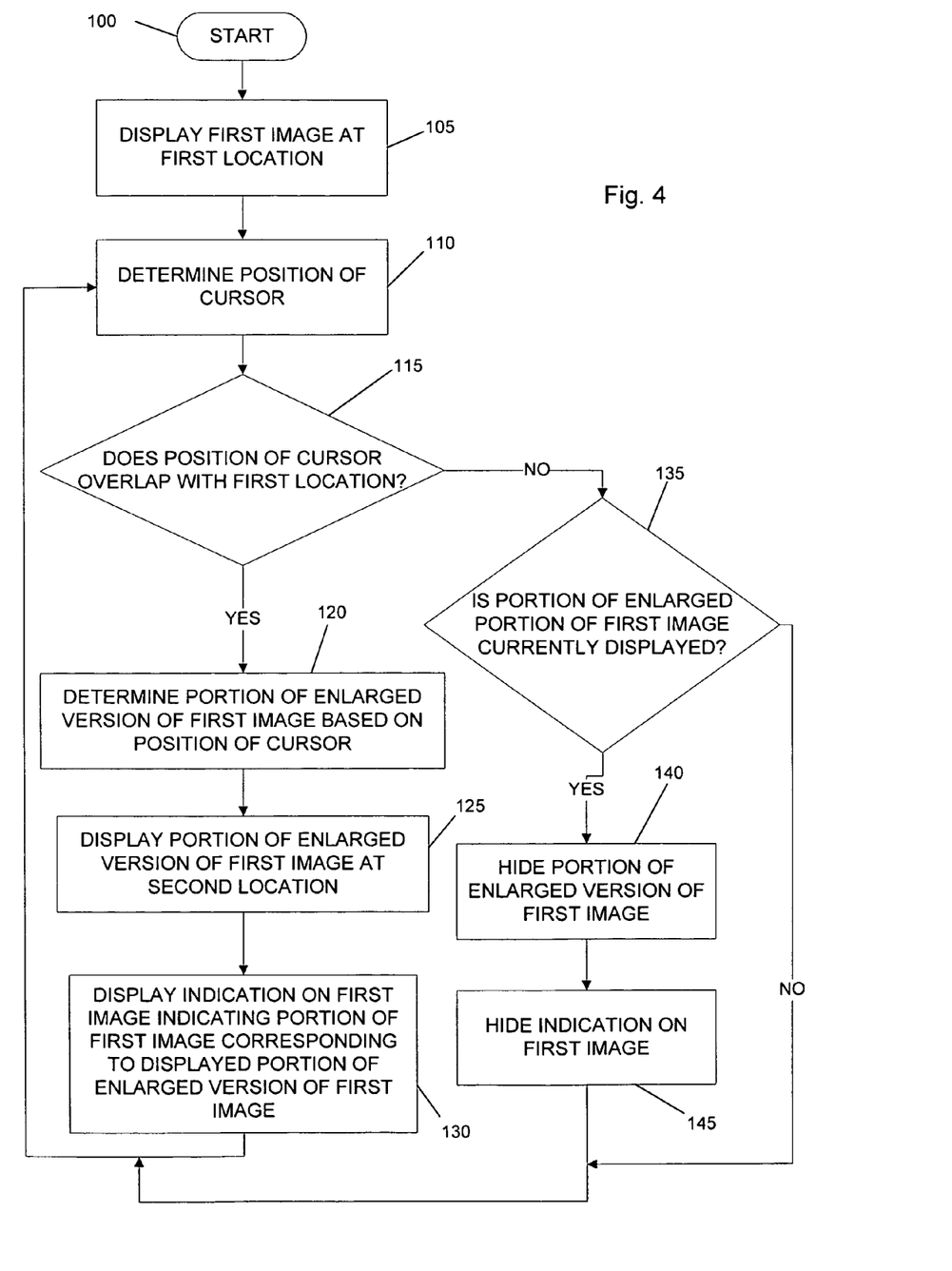
FIG. 4 is a flow chart illustrating an exemplary process of displaying a portion of an enlarged version of an image.

FIG. 4 illustrates an exemplary process of displaying the first image 52 and a portion of the second image 54 on the display 22. In some embodiments, the display process illustrated in FIG. 4 is performed with the workstation 20 executing the enlargement application 50. It should be understood that the process steps illustrated in FIG. 4 are exemplary in order and content, and the display process can be accomplished with a subset of the depicted steps or additional and alternative steps.

As illustrated in FIG. 4, the process begins at start block 100. At block 105, the workstation 20 displays the user interface 27 on the display 22. The user interface 27 includes the first image 52 displayed at a first location on the user interface 27. The user interface 27 can also include the cursor 28. As noted above, the workstation 20 may execute the enlargement application 50 to generate and display the user interface 27.

In some embodiments, the workstation 20 displays multiple versions of the first image 52. For example, each version of the first image 52 can represent an object from a particular angle, in a particular environment, and the like. The workstation 20 displays one or more of the versions of the first image 52 at the same time on the user interface 27. In some embodiments, the workstation 20 also swaps or changes the version of the first image 52 displayed with the user interface 27 based on the position of the cursor 28. The workstation 20 also displays a first version of the first image 52 for a predetermined amount of time before replacing the first version of the first image 52 with a second version. In some embodiments, the memory module 42 stores multiple pre-generated versions of the first image 52. The workstation 20 also dynamically generates multiple versions of the first image 52 based on one or more second images 54 stored in the memory module 42.

At block 110, the workstation 20 determines a position of the cursor 28 displayed on the display 22. As previously described, the user 10 may use the keyboard 24, the cursor control device 26, and/or other input peripherals to indicate a position of the cursor 28. The keyboard 24, cursor control device 26, and/or other input peripherals receives input provided by the user 10 and transmits the input to the input/output module 44 of the workstation 20. The input/output module 44 forwards the input to the processor 40, and the processor 40 analyzes the input to determine a position of the cursor 28. Capturing and analyzing mouse and keyboard events are well-known functions and procedures and, therefore, are not discussed in further detail.

After the workstation 20 determines a position of the cursor 28, the workstation 20 determines if the determined position of the cursor 28 overlaps with the first location of the first image 52 (block 115). In some embodiments, the first location of the first image 52 includes multiple positions on the user interface 27, and if the position of the cursor 28 is the same as a position included in the first location, then the position of the cursor 28 overlaps with the first location of the first image 52.

If the workstation 20 determines that the position of the cursor 28 overlaps with the first location of the first image 52, the workstation 20 determines a portion of the second image 54 based on the position of the cursor 28 (block 120). As previously described, the second image 54 can include the first image 52 multiplied by a predetermined factor. The workstation 10 multiplies the position of the first image 52 that overlaps with the position of the cursor 28 by the predetermined factor to find a corresponding position of the second image 54. The portion determined by the workstation 20 can include a clipping or cropped portion of the second image 54 centered at the corresponding position of the second image 54. In some embodiments, the portion of the second image 54 can include a predetermined amount of pixels of the second image 54. For example, the portion can include 40,000 pixels (i.e., 200 pixels wide and 200 pixels high) of the pixels of the second image 54 centered at the corresponding position of the enlarged version of the first image 54.

Figure 5:
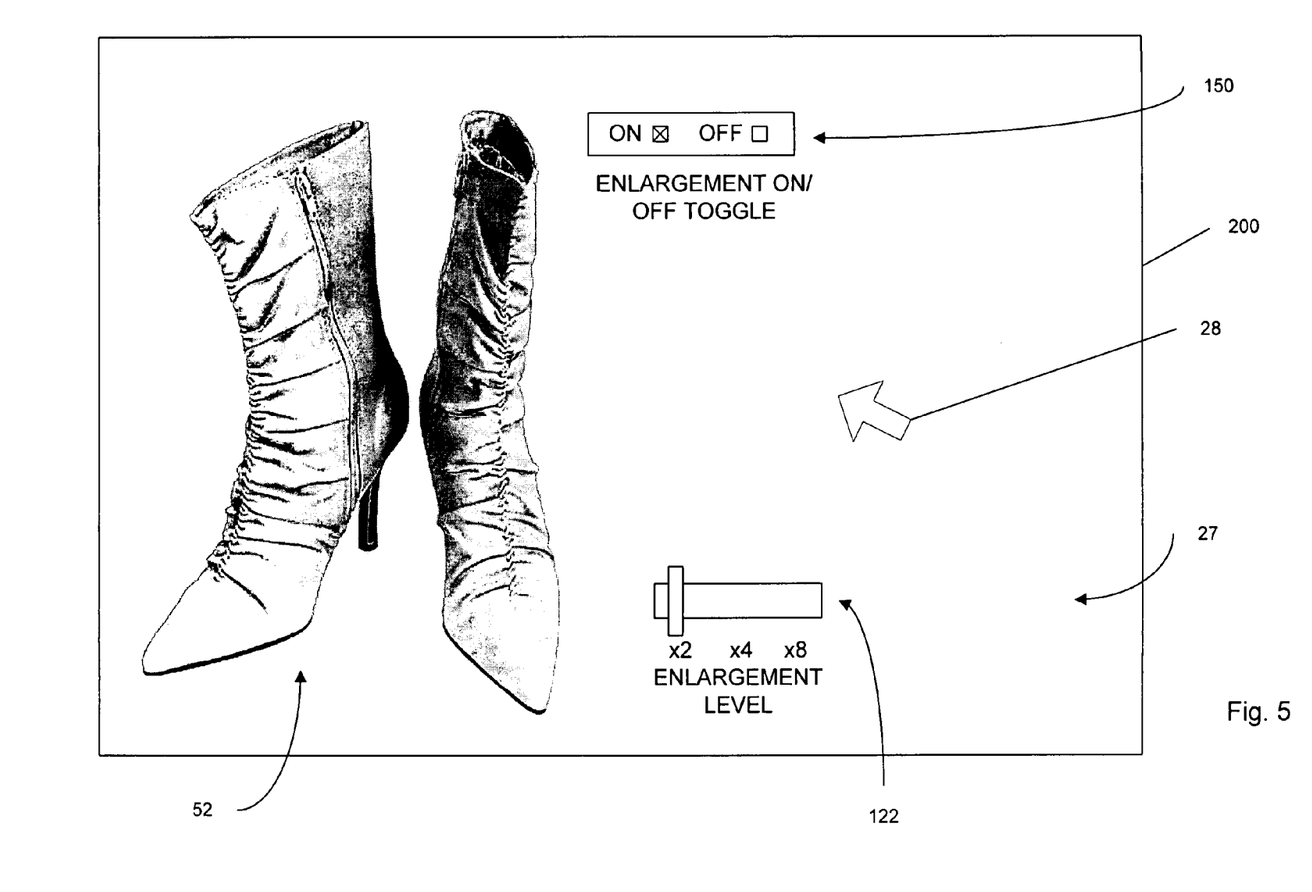
FIG. 5 illustrates an exemplary screen shot displaying a first image.

In some embodiments, the user interface 27 also provides an enlargement selector 122 (see FIG. 5). The user 10 operates the enlargement selector 122 to select a magnification or enlargement level for the second image 54. In some embodiments, the memory module 42 stores multiple enlarged versions of the first image 52 and the workstation 20 selects one of the enlarged versions based on an enlargement level indicated by the user 10 with the enlargement selector 122. For example, the memory module 42 can store enlarged versions of a first image that represent a first image multiplied or enlarged by a factor of 2, a factor of 4, and a factor of 8.

After the workstation 20 determines a portion of the second image 54, the workstation 20 displays the portion of the second image 54 at a second location of the user interface 27 (block 125). In some embodiments, the second location does not overlap with the first location such that the first image 52 and the portion of the second image 54 do not overlap. However, the second location can overlap with the first location.

In some embodiments, the second location of the portion of the second image 54 is based on the position of the cursor 28. For example, if the position of the cursor 28 is near a top portion of the first image 54, the portion of the second image 54 is displayed near a bottom portion of the first image 54 and vice versa. The portion of the second image 54 can also be displayed next to the position of the cursor 28 such that the second location of the portion of the second image 54 changes as the position of the cursor 28 changes.

The workstation 20 can also determine and display multiple portions of the second image 54 or other enlarged versions of the first image 52. For example, the memory module 42 can store multiple enlarged versions of a first image. The multiple enlarged versions can represent an object viewed from a particular angle, in a particular environment, and the like. As described above, the multiple enlarged versions of a first image can also represent versions of the first image magnified or enlarged by various predetermined factors. In some embodiments, the workstation 20 determines multiple portions from multiple enlarged versions of a first image and displays the multiple portions at the same time on the user interface 27. The workstation 20 also determines multiple portions and displays one or more of the multiple portions depending on the position of the cursor 28. Furthermore, the workstation 20 can determine multiple portions and can display a first portion for a predetermined amount of time before replacing the first portion with a second portion.

In some embodiments, the workstation 20 also displays an indication on the first image 52 at block 130 if the position of the cursor 28 overlaps with the first location of the first image 52. The indication specifies a portion of the first image 52 corresponding to the displayed portion of the second image 54. The indication can include a border or a shape that overlays the first image 52 and marks a portion or clipping of the first image 52 that corresponds to the magnified or enlarged portion displayed at the second location. In some embodiments, the indication is transparent such that the portion of the first image 52 under the indication can still be generally seen.

In some embodiments, additional functionality is provided if the position of the cursor 28 overlaps with the first location of the first image 52. For example, parts of the user interface 27 are hidden such that they do not interfere with the portion of the second image 54 displayed at the second location. Parts of the user interface 27 can also disabled such that they cannot be used or activated while the portion of the second image 54 is displayed.

Specific functionality can also be provided based on a particular position of the cursor 28. For example, the position of the cursor 28 can specify where one or more portions of the second image 54 should be displayed. The position of the cursor 28 can also specify characteristics of one or more enlargement regions or portions to display. For example, a particular position of the cursor 28 can cause a portion of a particular size to be displayed.

After displaying the portion of the second image 54 and the indication, the workstation 20 returns to block 110 to determine a subsequent position of the cursor 28. In some embodiments, the workstation 20 determines a position of the cursor 28 whenever the position of the cursor 28 changes, and consequently, every change of position of the cursor 28 that overlaps with the first location also causes the workstation 20 to determine a different portion of the second image 54 to replace the previously displayed portion based on the new position of the cursor 28.

If, however, after determining a position of the cursor 28, the workstation 20 determines that the position of the cursor 28 does not overlap with the first location of the first image 52, the workstation 20 then determines if a portion of the second image 54 is currently displayed on the user interface 27 (block 135). In some embodiments, a portion of the second image 54 should only be displayed when the position of the cursor 28 overlaps with the first location of the first image 52. If the previous position of the cursor 28 did overlap with the first location of the first image 52 but the current position of the cursor 28 does not overlap with the first location of the first image 52, the previously-determined portion of the second image is currently displayed. If the previously determined portion of the second image 54 is currently displayed, the workstation 20 hides the previously determined portion of the second image 54 such that no portion of the second image 54 is displayed (block 140). The workstation 20 also hides the corresponding indication on the first image 52 (at block 145) if the previously determined portion is displayed.

After hiding the previously determined portion of the second image 54 and the corresponding indication on the first image 52, the workstation 20 returns to block 110 to determine a subsequent position of the cursor.

In some embodiments, the workstation 20 may performs additional functionality if the position of the cursor 28 no longer overlaps with the first location. For example, the workstation 20 can unhide or reactivate parts of the user interface 27 that were previously hidden or deactivated when the position of the cursor 28 did overlap with the first location.

Alternatively, if the position of the cursor 28 does not overlap with the first location of the first image 52, and the workstation 20 determines that a portion of the second image 54 is not currently displayed (block 135) (i.e., the previous position of the cursor also did not overlap with the first location of the first image 52), the workstation 20 returns to block 110 to determine a subsequent position of the cursor.

In some embodiments, the user interface 27 includes an enlargement on/off toggle 150 (see FIG. 5). The user 10 operates the enlargement on/off toggle 150 to specify whether the workstation 20 should display a portion of an enlarged version of a first image as described above. For example, when the enlargement on/off toggle 150 is set to "OFF," a portion of an enlarged version of a first image is not displayed on the user interface 127 regardless of the position of the cursor 28. In some embodiments, the setting of the enlargement on/off toggle 150 relates to all images displayed with the user interface 27. The enlargement on/off toggle 150 can also be related to a single image, and a separate enlargement on/off toggle 150 can be supplied for each image displayed with the user interface 27.

FIG. 5 illustrates an exemplary screen shot 200 of the user interface 27 displayed on the display 22. The screen shot 200 illustrates the first image 52 displayed at a first location of the user interface 27. The screen shot 200 also illustrates the cursor 28. FIG. 5 illustrates a state of the user interface 27 where the position of the cursor 28 does not overlap with the location of the first image 52 and a portion of the second image 54 is not displayed. FIG. 5 also illustrates an exemplary enlargement selector 122 and an exemplary enlargement on/off toggle 150.

Figure 6:
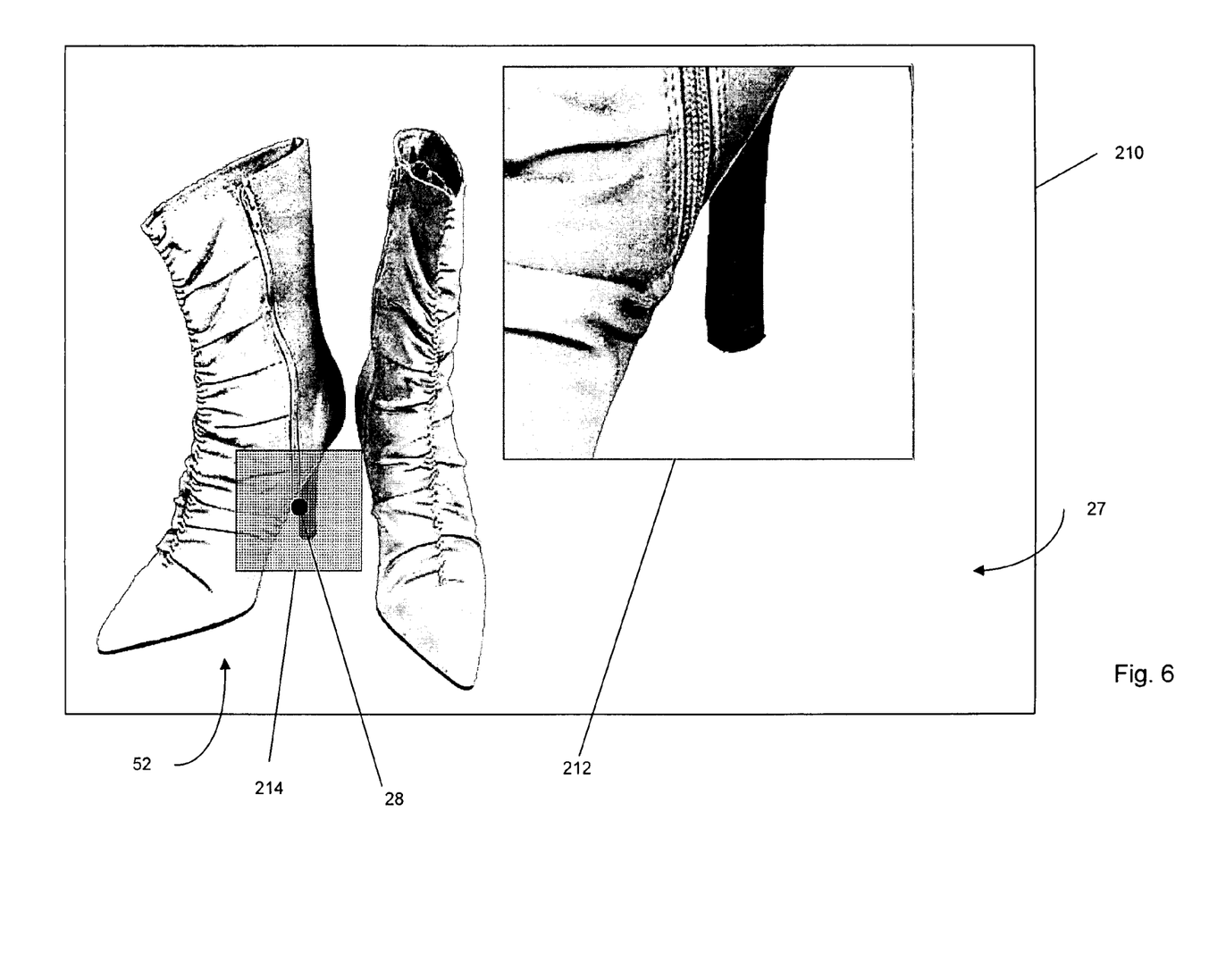
FIG. 6 illustrates an exemplary screen shot displaying the first image of FIG. 5 and a portion of an enlarged version of the first image of FIG. 5.

FIG. 6 illustrates another exemplary screen shot 210 of the user interface 27. The screen shot 210 also illustrates the first image 52 displayed at a first location and the cursor 28. In some embodiments, as illustrated in FIG. 6, the shape and/or size of the cursor 28 changes when the position of the cursor 28 overlaps with the first location of the first image 52. For example, the cursor 28 can take the form of a point to decrease the amount of the first image 52 that is blocked by the cursor 28.

In contrast to screen shot 200 of FIG. 5, however, the screen 210 illustrates a state of the user interface 27 where the position of the cursor 28 overlaps with the first location of the first image 52 and a portion 212 of the second image 54 is displayed. The screen shot 210 also illustrates an indication 214 (in the form of a square grid) displayed on the first image 52. As described above, the indication 214 specifies or defines a portion of the first image 52 that is magnified or enlarged and displayed with the portion 212.

Figure 7:
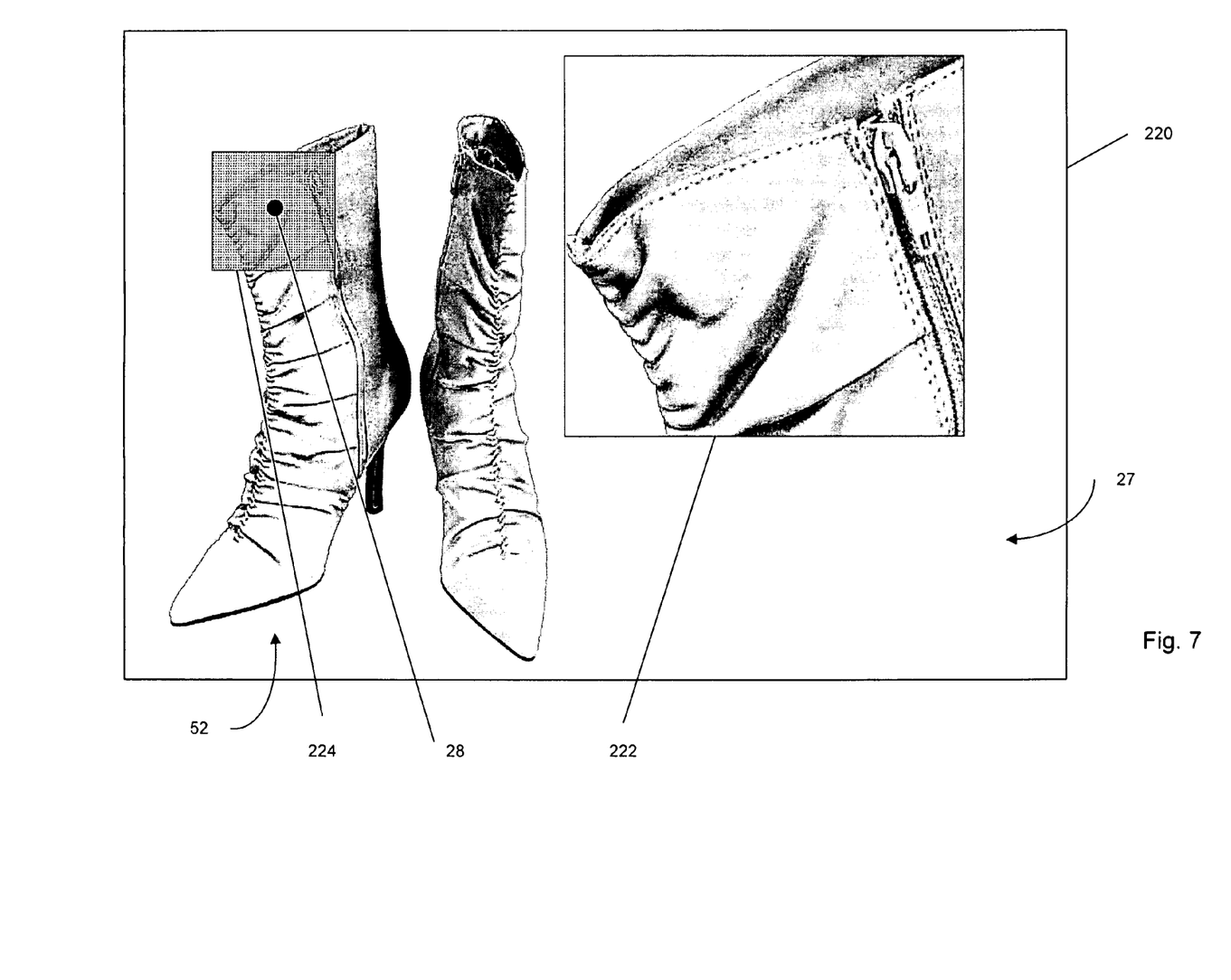
FIG. 7 illustrates another exemplary screen shot displaying the first image of FIG. 5 and a portion of an enlarged version of the first image of FIG. 5.

FIG. 7 illustrates another exemplary screen shot 220 of the user interface 27. Similar to the screen shots 200 and 210, the screen shot 220 illustrates the first image 52 displayed at a first location and the cursor 28. The screen shot 220 also illustrates a state of the user interface 27 where the position of the cursor 28 overlaps with the first location of the first image. The position of the cursor 28 illustrated in FIG. 7, however, is different from the position of the cursor 28 illustrated in FIG. 6, and, subsequently, the screen shot 220 illustrates a different portion 222 of the second image 54 displayed at a second location. As previously described, the portion 222 differs from the portion 212 illustrated in FIG. 6 since the portion to be displayed by the workstation 20 depends on the position of the cursor 28. The center point or position of the portion 212 corresponds to the position of the cursor 28 on the first image 52, which is on the heel of one of the boots, as illustrated in FIG. 6. Likewise, the center point or position of the portion 222 corresponds to the position of the cursor 28 on the first image, which is on the top of the zipper of one of the boots, as illustrated in FIG. 7. The screen shot 220 also illustrates an indication 224 that specifies a portion of the first image 52 that corresponds to the displayed portion 222.

Various features and advantages of the invention are set forth in the following claims.

The invention claimed is:

1. A method of displaying an enlarged image on a display of a client device running an enlargement application executed by a browser program, the client device configured to generate a user interface in which a user may control a position of a cursor, the method comprising:

transmitting, over a network, a first image and an enlarged version of the first image from a server to the client device;

displaying the first image at a first location on the display;

determining whether the position of the cursor generated by the client device overlaps with the first location of the first image;

if the position of the cursor overlaps with the first location of the first image, determining a portion of the enlarged version of the first image with the client device without requesting additional information from the server, where the portion of the enlarged version of the first image is determined based on the position of the cursor;

displaying the portion of the enlarged version of the first image at a second location on the display of the client device while continuing to display the first image at the first location;

displaying an indication on the first image that indicates a portion of the first image that corresponds to the displayed portion of the enlarged version of the first image; and displaying a different portion of the enlarged version of the first image whenever the position of the cursor changes.

2. A method as claimed in claim 1, further comprising not displaying the portion of the enlarged version of the first image if the position of the cursor does not overlap with the first location of the first image.

3. A method as claimed in claim 1, further comprising providing zoom selector.

4. A method as claimed in claim 3, further comprising selecting an enlargement level with the zoom selector.

5. A method as claimed in claim 4, further comprising selecting an enlarged version of the first image based on the enlargement level.

6. A method as claimed in claim 1, further comprising providing an enlargement on/off toggle.

7. A computer-readable medium including instructions for displaying an enlarged image on a display of a client device, the client device configured to generate a user interface in which a user may control a position of a cursor, the computer-readable medium comprising instructions for:

receiving a first image and an enlarged version of the first image from a server;

displaying the first image at a first location on the display;

determining whether the position of the cursor generated by the client device overlaps with the first location of the first image;

if the position of the cursor overlaps with the first location of the first image, determining a portion of the enlarged version of the first image without requesting additional information from the server, where the portion of the enlarged version of the first image is determined based on the position of the cursor;

displaying the portion of the enlarged version of the first image at a second location on the display of the client device while displaying the first image at the first location;

displaying an indication on the first image that indicates a portion of the first image that corresponds to the displayed portion of the enlarged version of the first image; and displaying a different portion of the enlarged version of the first image whenever the position of the cursor changes.

8. A computer-readable medium as claimed in claim 7, further comprising instructions for not displaying the portion of the enlarged version of the first image if the position of the cursor does not overlap with the first location of the first image.

9. A system for displaying an enlarged image on a display of a client device, the client device running an enlargement application executed by a browser program and configured to generate a user interface in which a user may control a position of a cursor, the system comprising:

a server;

a first image; and an enlarged version of the first image; and wherein the enlargement application executed by the client device is configured to receive at least the enlarged version of the first image from the server; to display the first image at a first location on the display; to determine whether the position of the cursor overlaps with the first location of the first image; if the position of the cursor overlaps with the first location of the first image, to determine a portion of the enlarged version of the first image without requesting additional information from the server, where the portion of the enlarged version of the first image is determined based on the position of the cursor; to display the portion of the enlarged version of the first image at a second location on the display; to display a different portion of the enlarged version of the first image whenever the position of the cursor changes; to display the first image at the first location while displaying the portion of the enlarged version of the first image at the second location; and to display an indication on the first image that indicates a portion of the first image that corresponds to the displayed portion of the enlarged version of the first image.

10. A system as claim in claim 9, wherein the enlargement application is further configured to not display the portion of the enlarged version of the first image if the position of the cursor does not overlap with the first location of the first image.

11. A system for displaying an enlarged image on a display of a client device, the client device configured to generate a user interface in which a user may control a position of a cursor, the system comprising:

the client device; and a server configured to transmit a first image and an enlarged version of the first image to the client device;

the client device including a memory configured to store the first image, the enlarged version of the first image, and an enlargement application, the enlargement application configured to display the first image at a first location on the display; to determine whether the position of the cursor overlaps with the first location of the first image; if the position of the cursor overlaps with the first location of the first image, to determine a portion of the enlarged version of the first image without requesting additional information from the server, where the portion of the enlarged version of the first image is determined based on the position of the cursor; and to display the portion of the enlarged version of the first image at a second location on the display; and a processor configured to retrieve the application from the memory and to execute the application, wherein the enlargement application is further configured to display the first image at the first location while displaying the portion of the enlarged version of the first image at the second location, to display a different portion of the enlarged version of the first image whenever the position of the cursor changes, and to display an indication on the first image that indicates a portion of the first image that corresponds to the displayed portion of the enlarged version of the first image.

12. A system as claimed in claim 11, wherein the enlargement application is further configured to not display the portion of the enlarged version of the first image if the position of the cursor does not overlap with the first location of the first image.

* * * * *